Aug. 18, 1936.  O. L. STARR  2,051,186
TRACTOR
Filed April 29, 1933  6 Sheets-Sheet 1
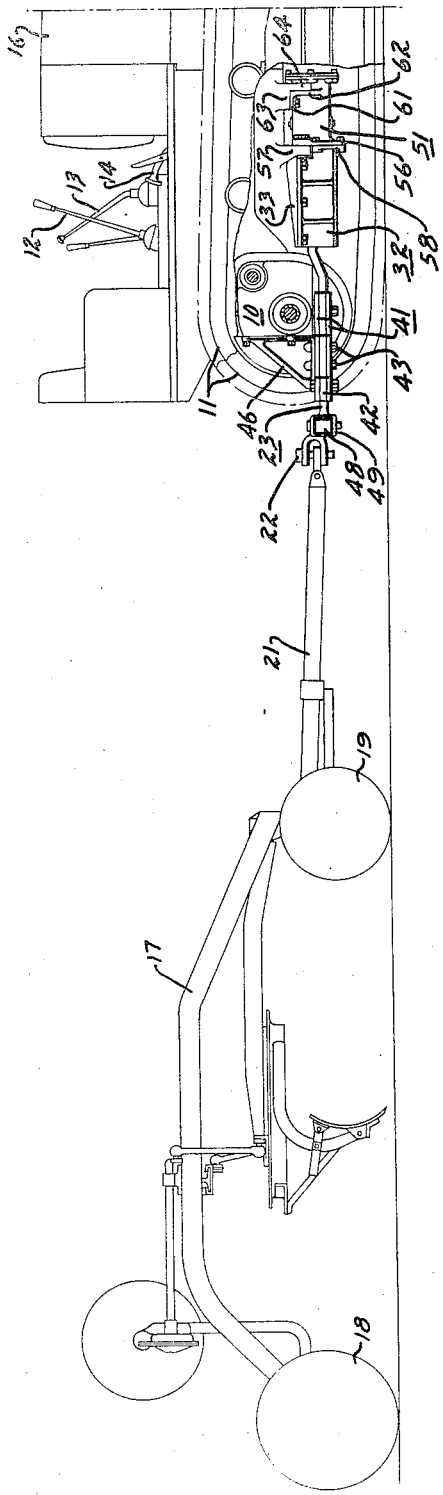
INVENTOR.
OSCAR L. STARR
BY
ATTORNEY.

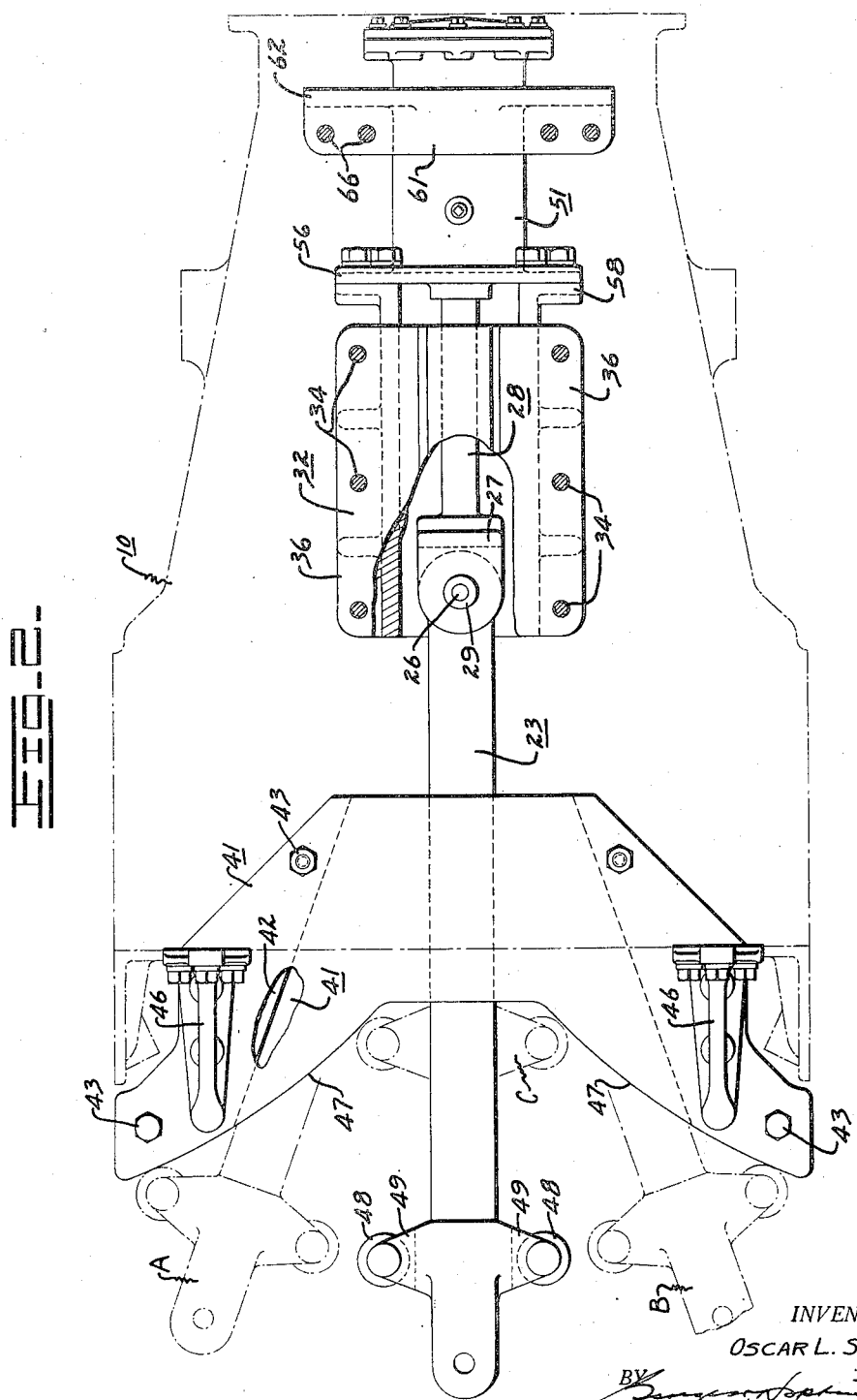

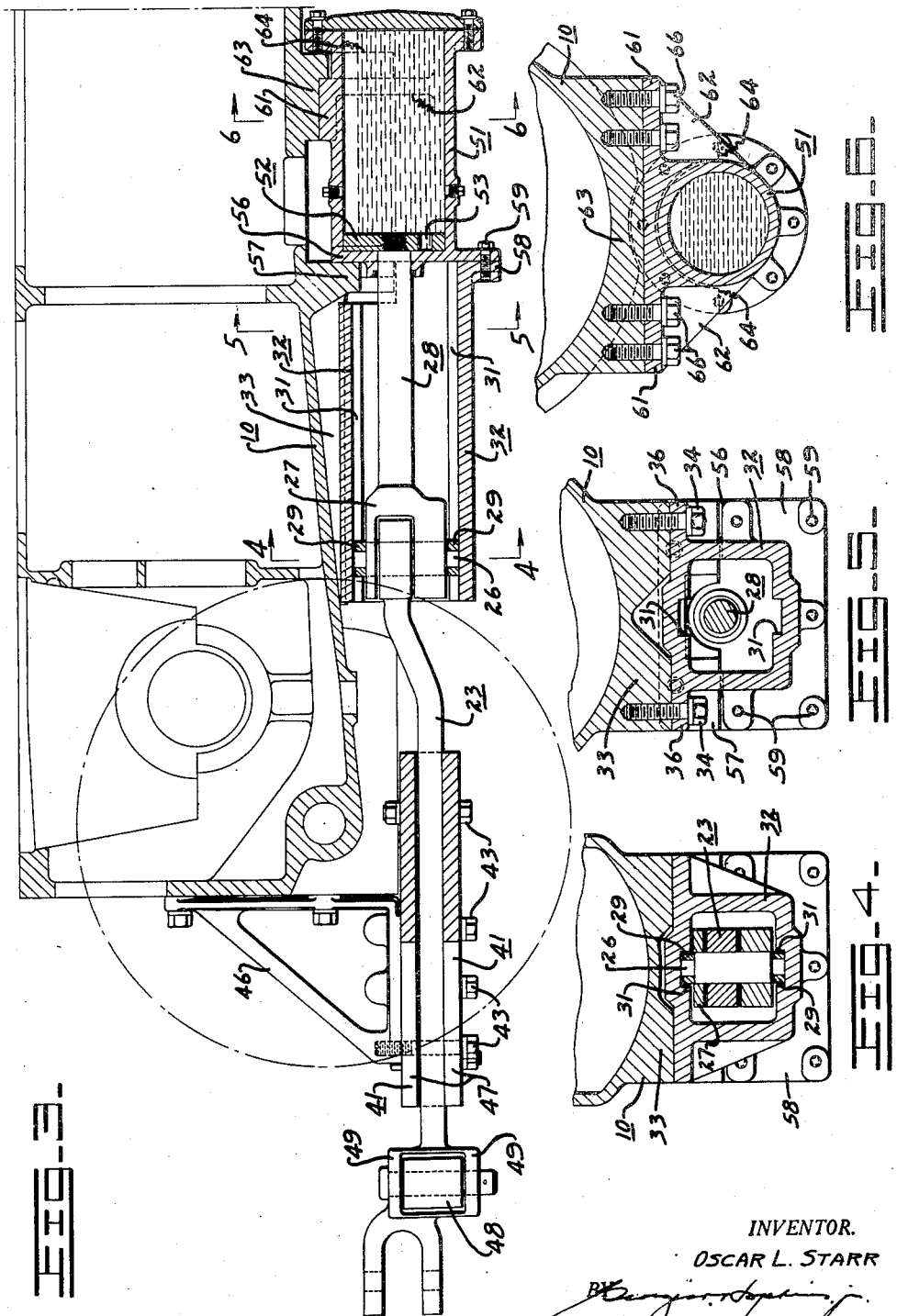

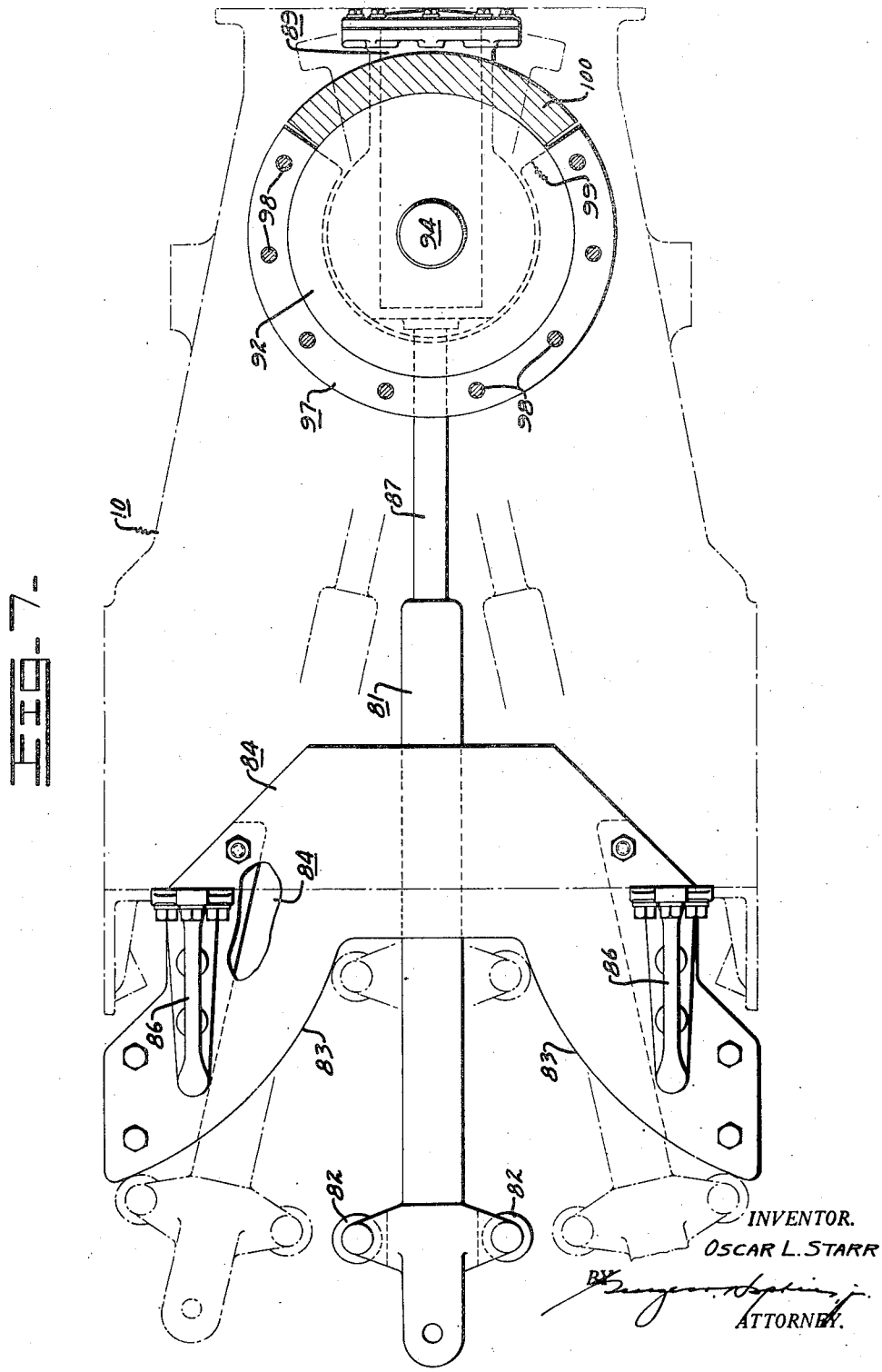

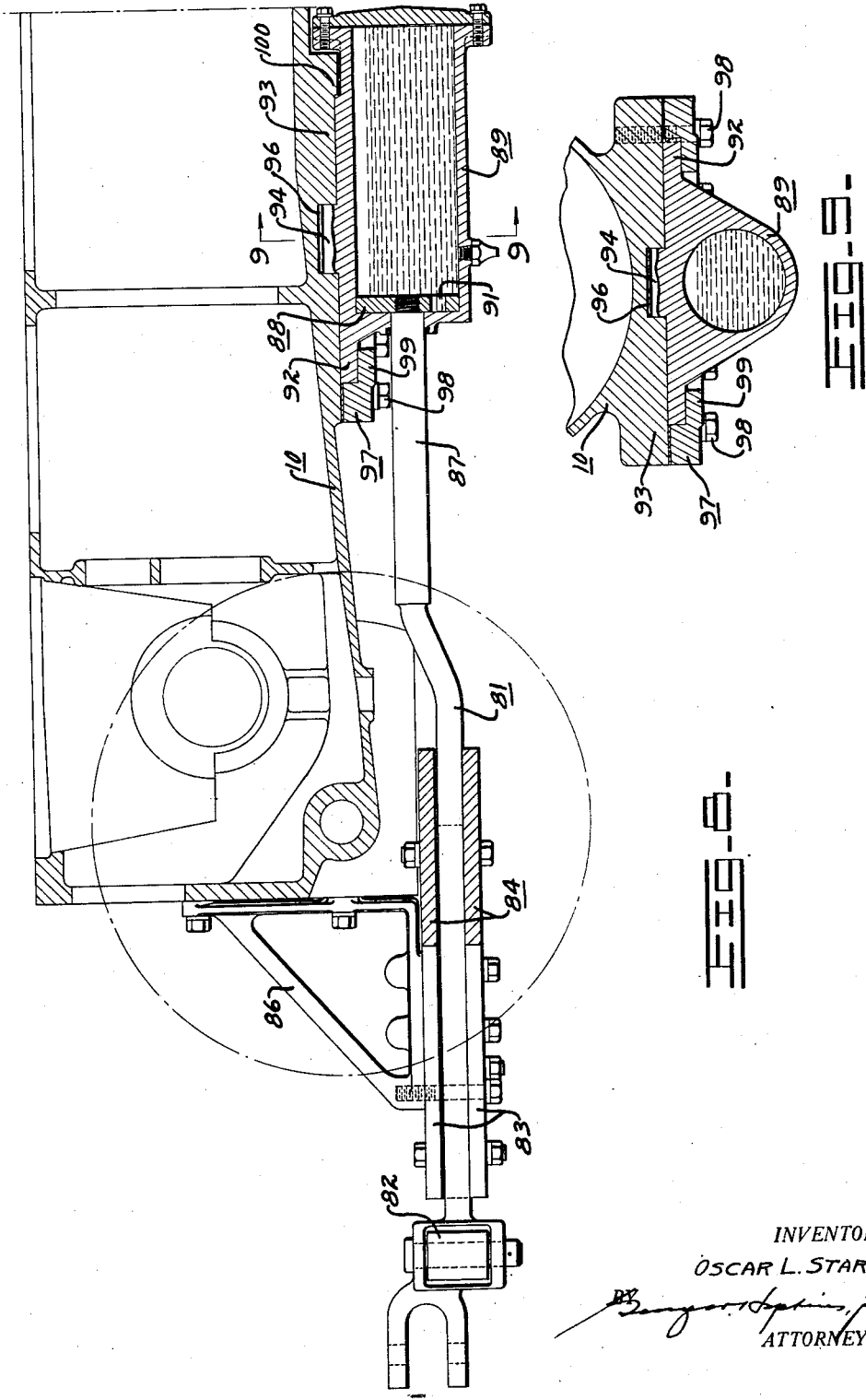

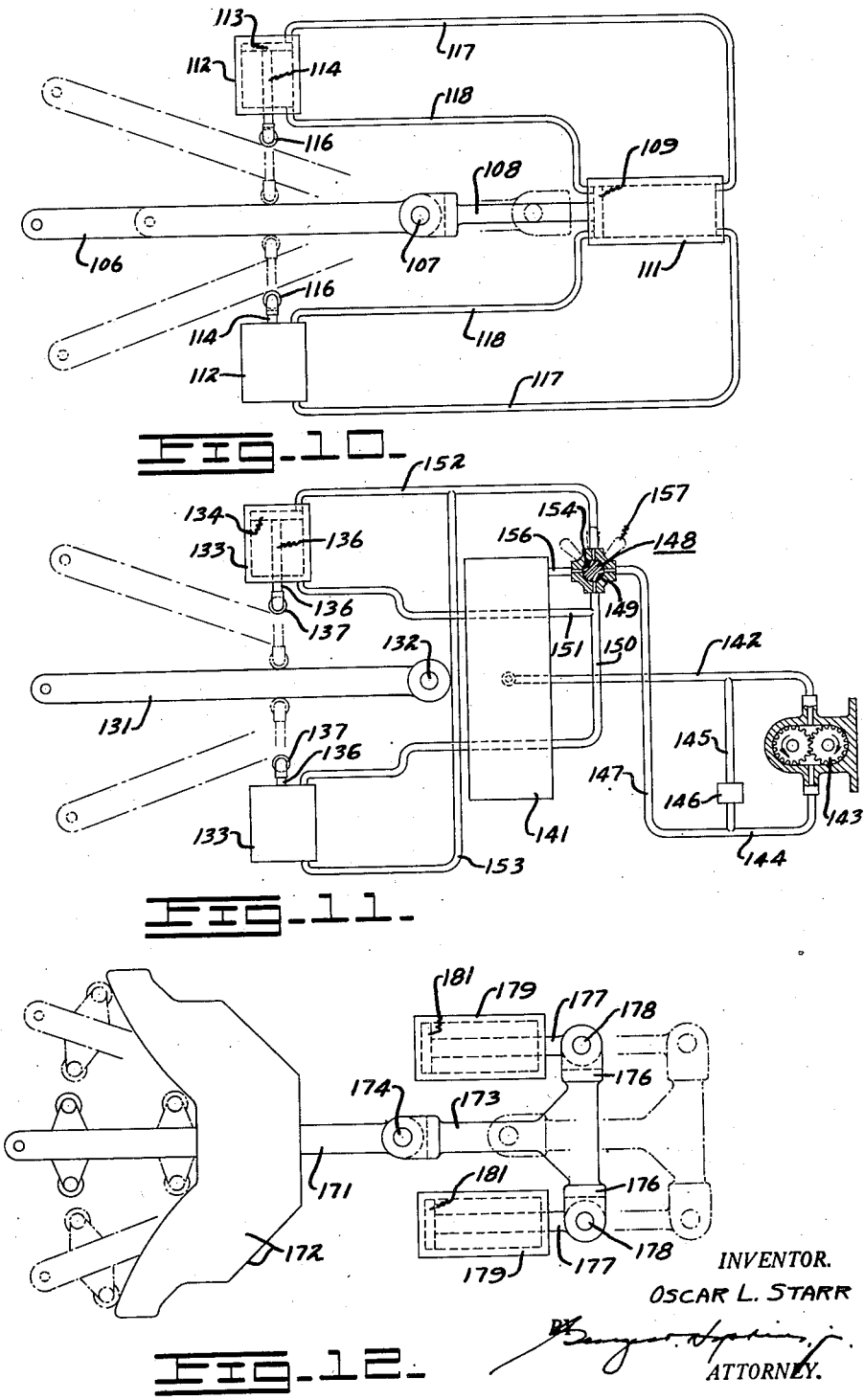

Patented Aug. 18, 1936

2,051,186

UNITED STATES PATENT OFFICE 2,051,186

TRACTOR

Oscar L. Starr, Mission San Jose, Calif., assignor to Caterpillar Tractor Co., San Leandro, Calif., a corporation of California Application April 29, 1933, Serial No. 668,599

21 Claims. (Cl. 280—33.9)

The present invention relates to draft vehicles, such as tractors, and more particularly to the provision of drawbar means therefor. In operation, when a tractor is pulling a draft vehicle, the draft connection is under tension and hence tends to maintain itself in a straight line, whereby the greatest advantage can be obtained from a free lateral swinging drawbar. However, in backing the draft vehicle or in case the draft vehicle is going down-hill so that the drawn load tends to push the draft vehicle, the draft connection is under compression, and if a free lateral swinging drawbar is used, tends to buckle. When this condition obtains, the draft force cannot be applied at the most advantageous angle and the drawn vehicle sometimes causes the tractor to turn, rather than the tractor controlling movement of the drawn vehicle. If a fixed drawbar is used, certain advantages are obtained in backing or down-hill operations, but the advantages of a free lateral swinging drawbar during pulling of the drawn vehicle are lost. The present invention provides a drawbar which has a free lateral swinging movement when the drawn vehicle is being pulled, and is fixed in position when the drawn vehicle is being pushed, i. e., when the tractor is backing, or when the tractor is going down-hill so that the drawn load tends to place the drawbar under compression.

It is an object of the invention to provide a self-centering drawbar for a draft vehicle.

It is an object of the invention to provide a tractor having a drawbar which is placed automatically in a fixed position when the tractor is backing, or when the drawn load tends to place the drawbar under compression.

Another object of the invention is to provide means for positioning the drawbar of a tractor in fixed position during backing operation of the tractor, or when the drawn load tends to place the drawbar under compression.

Another object of the invention is to provide a tractor having a drawbar which is movable from a free lateral swinging position to a fixed position.

Another object of the invention is to provide a tractor having a drawbar which is movable from a free lateral swinging position to a fixed position, and means for yieldably resisting movement of the drawbar from either of said positions to the other.

Another object of the invention is to provide a tractor having a drawbar which is movable from a free lateral swinging position to a fixed position, and means for cushioning movement of the drawbar from one of said positions to the other.

Another object of the invention is to provide a tractor including means for mounting the drawbar thereof for free lateral swinging movement under a load placing tension thereon, and means conditioned by the placing of compression on the drawbar for preventing such lateral swinging movement.

Another object of the invention is to provide cam means for positioning the drawbar of the tractor in a fixed position.

Another object of the invention is to provide hydraulic means for positioning the drawbar of a tractor in fixed position.

Another object of the invention is to provide a tractor drawbar movable from a free lateral swinging position to a fixed position, and means aligned with said drawbar in its central position for cushioning movement thereof.

Another object of the invention is to provide a tractor drawbar movable from a free lateral swinging position to a fixed position, and means oscillatable with the drawbar for cushioning movement thereof from one of said positions to the other.

Another object of the invention is to provide a tractor drawbar movable from a free lateral swinging position to a fixed position, and spaced cushioning means arranged to either side of the drawbar for yieldably resisting movement thereof from either of said positions to the other.

Another object of the invention is to provide the drawbar of a tractor which is movable from a free lateral swinging position to a fixed position, means for yieldably resisting movement of said drawbar from either of said positions to the other, and means responsive to operation of said cushioning means to maintain the drawbar in its fixed position.

Another object of the invention is to provide a free lateral swinging drawbar for a tractor, and means for maintaining said drawbar in a fixed position.

Another object of the invention is to provide a free lateral swinging drawbar for a tractor, and controllable means for moving the drawbar to a fixed position.

Other objects will appear as the description progresses.

Description of figures

Figs. 1-6 illustrate the preferred form of the invention.

Fig. 1 is a side elevation of a tractor embodying the instant invention, a draft vehicle in the form of a grader being connected thereto.

Fig. 2 is a plan view of the drawbar, the tractor transmission case being indicated in phantom lines.

Fig. 3 is a longitudinal, vertical section taken through the longitudinal center line of the transmission case.

Fig. 4 is a section on the line 4—4 in Fig. 3.

Fig. 5 is a section on the line 5—5 in Fig. 3.

Fig. 6 is a section on the line 6—6 in Fig. 3.

Figs. 7-9 illustrate a second form of the invention.

Fig. 7 is a plan view of the drawbar, the tractor transmission case being indicated in phantom lines.

Fig. 8 is a longitudinal, vertical section taken through the longitudinal center line of the transmission case.

Fig. 9 is a section on line 9—9 in Fig. 8.

Figs. 10-12 are diagrammatic views illustrating other forms of the invention.

Description of mechanism

The first form of the invention, illustrated in Figs. 1-6, is disclosed as embodied in a tractor of the track-type, including main frame or body portion 10 (Fig. 1), comprising the transmission case, supported upon a pair of endless track mechanisms 11. Operation of the tractor is controlled through steering clutch control levers 12, gear shift lever 13 and brake pedals 14 at the operator's station, rearwardly of power plant 16. The drawn vehicle can be of any suitable type of machine and is shown as a road grader, which includes frame 17 having rear supports 18 and front supports 19. Draft pole 21 of the drawn vehicle is pivotally connected by pin 22 to drawbar 23 of the tractor.

The drawbar is mounted for free lateral swinging movement in one relatively adjusted position with respect to the tractor when pulling the draft vehicle, and upon reverse movement of the tractor or placing of compression on the drawbar, the drawbar is moved relative to the tractor to a fixed position to facilitate maneuvering of the vehicle train. To accomplish this purpose, drawbar 23 (Figs. 2 and 3) is pivoted about pin 26, mounted in fork end 27 of piston rod 28. Rollers 29 on the respective ends of said pin 26 travel in guideways 31 (Figs. 3 and 4) in bracket 32. Said bracket 32 is secured to pads 33 (Fig. 5), integral with transmission case 10, by screws 34 passing through flanges 36 of said bracket 32 and having threaded engagement in pads 33. Said guideways 31 extend along the longitudinal center line of the tractor so that the pivot point of the drawbar is guided for movement along this line. It is seen therefore that the drawbar is mounted for endwise movement with respect to transmission case 10.

Cam means are provided for relatively adjusting the drawbar with respect to the tractor from free lateral swinging position to a fixed position during relative endwise movement thereof with respect to the tractor occurring when the drawbar is placed under compression by relative movement between the tractor and the drawn load. Said means comprises vertically spaced plates 41 (Figs. 1-3) spaced apart by plates 42 secured therebetween by bolts 43. Plates 41 are mounted on transmission case 10 by brackets 46, being positioned partly beneath said transmission case 10 and extending rearwardly thereof. Plates 41 (Figs. 2 and 3) are similar and each is provided with opposite converging cam surfaces 47 at the rear, which are adapted to be engaged by rollers 48 mounted in opposite pairs of spaced ears 49 integral with drawbar 23. Upon placing of compression on the drawbar caused either by rearward movement of the tractor or by the load tending to push the tractor down-hill, said cam surfaces 47 are engaged by rollers 48 if drawbar 23 is displaced from its central position and serve as means for relatively moving the drawbar with respect to the tractor from its free lateral swinging position to its fixed position, the pivot point thereof being moved forwardly along the longitudinal center line of the tractor. Dotted line position A (Fig. 2) of drawbar 23 shows the drawbar in its extreme left-hand position, and position B shows said drawbar in its extreme right-hand position. When compression is placed on the drawbar, the drawbar is moved from either of positions A or B, or any intermediate position, to position C, the fixed position thereof. In this position, plates 41 prevent lateral swinging movement thereof.

Cushioning means are provided for yieldably resisting movement of the drawbar from its free lateral swinging position to its fixed position, or, vice versa. Piston rod 28 (Fig. 3) extends within cylinder 51 and has piston 52 threaded thereon within said cylinder. Said cylinder 51 is filled with a suitable fluid adapted to resist movement of piston 52 therein, said piston 52 being apertured at 53 to permit passage of the fluid from one side of the piston to the other. Said cylinder 51 is mounted on transmission case 10 which is provided with integral pads for transmitting draft forces from the transmission case to the cylinder which transmits such forces through piston 52 and rod 28 to drawbar 23. The rear wall of cylinder 51 has rectangular flange 56 (Figs. 2 and 3), the top portion of which engages pad 57 (Figs. 3 and 5) integral with transmission case 10, the lower portion of said flange 56 being secured to flange 58 of bracket 32 by screws 59.

Adjacent its front end, said cylinder 51 is provided with laterally extending bracket portion 61 having its ends extending beyond the side of the cylinder proper (Fig. 2), and being joined thereto by flanges 62 (Fig. 6). Said bracket 61 is seated in pad 63 integral with transmission case 10, said pad having arcuate extension 64 engaging the front face of bracket portion 61 and flanges 62. Bracket 61 is secured to pad 63 by screws 66. Thus it is seen that cylinder 51 is positioned between integral pads or extensions of the transmission case providing a simple and sturdy mounting therefor. As the drawbar moves relative to the tractor from its free lateral swinging position to its fixed position, or, vice versa, piston 52 is moved forwardly or rearwardly in cylinder 51, the fluid in said cylinder yieldably resisting such movement. Said cylinder and piston also serve as means for limiting endwise movement of the drawbar.

Thus it is seen that the drawbar is mounted for free lateral swinging movement under a load placing tension thereon, and is automatically placed in a fixed position under loads placing compression thereon. Plates 41 not only provide cam means to center and maintain the drawbar in its fixed position, but also provide a support to said drawbar preventing vertical movement thereof.

The second form of the invention is illustrated in Figs. 7-9, being generally similar to that form first described. In the second form of the invention, the pivot point of the drawbar is fixed, the means for cushioning movement of the drawbar from one of its endwise displaced positions on the tractor to the other, pivoting therewith. Drawbar 81 (Figs. 7 and 8) is provided at its front end with rollers 82 adapted to cooperate with cam surfaces 83 of plates 84 mounted on transmission case 10 by brackets 86. The above described cam means are similar in construction and operation to those described in connection with the first form of the invention.

Said drawbar 81 is provided with piston rod portion 87 at the front end thereof, having piston 88 threaded thereon within cylinder 89, said piston being apertured at 91 to permit passage of the fluid in cylinder 89 from one side of said piston 88 to the other during reciprocation of said piston within the cylinder. Said cylinder 89 is pivotally mounted on transmission case 10 and provides the pivot point for the drawbar. At its top, cylinder 89 has circular plate portion 92 engaging the bottom face of pad 93 of transmission case 10, central cylinder extension 94 (Figs. 8 and 9) of plate portion 92 being disposed within cylindrical recess 96 in pad 93. Split ring 97 (Figs. 7–9) is secured to pad 93 by screws 98 and has flange 99 engaging beneath the outer edge of plate portion 92 to secure cylinder 89 in place on crankcase 70. Pad 93 (Figs. 7 and 8) has arcuate extension 100 extending downwardly between the ends of ring 97 and engaging plate portion 92.

From the foregoing description, it is seen that cylinder 89 is mounted for oscillation on the transmission case about the axis of cylindrical extension 94, such axis coinciding with the axis of pivotal movement of the drawbar. It is to be noted that the effective length of the drawbar varies as it moves from its free lateral swinging position to its fixed position.

Fig. 10 illustrates diagrammatically a third form of the invention. In this form of the invention, drawbar 106 is pivoted at 107 to piston rod 108 having solid piston 109 mounted thereon within cylinder 111. Said piston rod 108 and cylinder 111 may be mounted on the tractor as shown in the form of the invention illustrated in Figs. 1–6. Hydraulic means are provided for automatically moving the drawbar to a fixed central position when compression is placed thereon. Similar cylinders 112 are disposed on opposite sides of drawbar 106, said cylinders being mounted in any convenient manner at the rear end of the transmission case. Each cylinder 112 has solid piston 113 placed therein, and piston rods 114 extending inwardly from cylinders 112 have rollers 116 at their inner ends. Said rollers 116 are adapted to contact the opposite sides of drawbar 106 to move it to a central position in a manner about to be described.

Each cylinder 112 has conduits 117, 118 opening into the respective ends thereof, and extending therefrom, and opening into the respective ends of cylinder 111. Cylinders 111, 112 and conduits 117, 118 are filled with a suitable fluid, the combined capacity of cylinders 112 equalling the capacity of cylinder 111. Drawbar 106 is shown in full lines in Fig. 10 in its free lateral swinging position, piston 109 contacting the rear end wall of cylinder 111. With the drawbar in this position, piston rods 114 are retracted and respective pistons 113 are substantially in contact with the outer end walls of respective cylinders 112. The above described position of the pistons obtains in all laterally displaced positions of the drawbar, the outermost positions thereof being illustrated in dotted lines in Fig. 10. When the drawbar is moved forwardly of the tractor upon the initial placing of compression thereon, piston 109 in cylinder 111 forces the fluid in said cylinder through conduits 117 to respective cylinders 112, the fluid in cylinders 112 being forced through conduits 118 into cylinder 111. Forcing of the fluid from cylinder 111 to respective cylinders 112 moves pistons 113 into contact with the respective inner end walls of cylinders 112, piston rods 114 being projected to the dotted line positions shown in Fig. 10, rollers 116 contacting the sides of drawbar 106 providing cam surfaces cooperating with rollers 116 to center the drawbar. The parts are maintained in this position as long as the drawbar is under compression, the system being substantially solid with fluid.

Thus it is seen that in this form of the invention, automatic means are provided for moving the drawbar to a fixed position upon placing of compression forces on the drawbar, and that cushioning means are provided for yieldably resisting movement of the drawbar from its free lateral swinging position to its fixed position, and vice versa.

Fig. 11 illustrates diagrammatically a fourth form of the invention. In this form of the invention, manually controlled power operated means are provided for positioning and maintaining the drawbar in a fixed position while it is under compression.

Drawbar 131 is pivoted at 132 on the transmission case in any suitable manner. Similar cylinders 133 are disposed to either side of drawbar 131, said cylinders being similar to cylinders 112 shown in Fig. 10, and each having a piston 134, piston rod 136, associated therewith. Rollers 137 on the respective inner ends of piston rod 136 are adapted to contact drawbar 131 to position and maintain said drawbar in a fixed position as indicated in the dotted line positions of rods 136 and rollers 137.

Hydraulic means are provided for projecting piston rods 136 inwardly to center the drawbar. Said means includes supply tank 141 from which fluid is drawn through conduit 142 by pump 143. The fluid from pump 143 may take either of two courses, the first being through conduit 144 and by-pass conduit 145, having suitable by-pass valve 146 placed therein, to conduit 142. The second course extends through conduit 144, conduit 147 to valve 148, and in the illustrated position of the valve, through passage 149 therein, to conduits 150 and 151 opening into respective inner walls of cylinders 133. With valve 148 in this position and the fluid being forced by the pump through conduits 150, 151, pistons 134 are held against the outer end walls of cylinders 133 and piston rods 136 are in retracted position whereby drawbar 131 can swing freely. During movement of piston 134 to the positions illustrated, the fluid previously in cylinders 133 is expelled therefrom through respective conduits 152, 153, through passage 154 of valve 148 and conduit 156 to tank 141. Control handle 157 is in its right-hand position for this valve setting.

When handle 157 is in its central position, passages 149 and 154 of valve 148 do not communicate with any of the conduits leading to said valve, and operation of the pump can be stopped, piston rods 136 being maintained in adjusted position. When handle 157 is in its left-hand position, passage 149 connects conduit 147 to conduits 152, 153 whereby piston rods are moved under fluid pressure to the dotted line positions thereof illustrated to prevent lateral swinging movement. If the drawbar is in a laterally displaced position, one of the sides thereof provides a cam surface cooperating with a roller to move the drawbar to its fixed position. During this operation, passage 154 connects conduits 150, 151 to conduit 156 to provide for return of the fluid expelled from cylinders 133 to tank 141. It is to be noted that pivot 132 for drawbar 131 serves to prevent damage to the parts when forces on drawbar 131 change from tension to compression or vice versa. Pivot 132, therefore, corresponds broadly to the cushioning means illustrated in the above described modifications in which the drawbar has longitudinal as well as oscillatory movement.

Fig. 12 illustrates a fifth form of the invention which is substantially similar to the form illustrated in Figs. 1-6, drawbar 171 and plates 172 being similar to drawbar 23 and plates 41, and similarly mounted. To conserve space, the cushioning means is provided in the form of a pair of cylinders disposed to either side of the drawbar and connected to the drawbar for simultaneous movement therewith. Yoke 173 is pivoted to drawbar 171 at 174, and laterally extending arms 176 thereof have piston rods 177 pivotally connected thereto at 178. Each piston rod 177 extends within cylinder 179, and has piston 181 mounted thereon similar to piston 52. The operation of the self-centering drawbar disclosed in Fig. 12 is identical with that disclosed in Figs. 1-6 and is not described in detail. It is to be noted that by employing the yoke and placing a pair of cylinders parallel and extending back along the drawbar, a substantial saving in space can be made both in length and in depth.

It is to be noted that in all forms of the invention, the drawbar is mounted for free lateral swinging movement, means being provided to condition the drawbar for operation in a fixed position when compression is placed thereon. The conditioning means in each form includes means spaced to either side of the drawbar and adapted for contact therewith to move the drawbar to its fixed position.

I, therefore, claim as my invention:

1. In a tractor, a drawbar, mounting means therefor providing a free, lateral swinging position for said drawbar, and a fixed position therefor, and means cushioning movement of said drawbar from one of said positions to the other.

2. In a tractor, a frame, and drawbar means on said frame, including a drawbar having relative longitudinal movement with respect to said frame, means for mounting said drawbar for free lateral swinging movement in one longitudinally displaced position thereof, means adapted to prevent swinging movement of said drawbar in another longitudinally displaced position thereof, and means yieldably resisting longitudinal movement of said drawbar, said movement resisting means and said frame having inter-engaging portions.

3. In a tractor, a drawbar, movable means associated therewith, and means responsive to movement of said drawbar to move said movable means into engagement therewith to prevent swinging movement thereof.

4. In a tractor, a drawbar having lateral swinging movement, movable means associated therewith, and power-operated means selectively operable to move said movable means into engagement therewith to prevent swinging movement thereof.

5. In a tractor, a drawbar mounted for free lateral swinging movement, and means for preventing such lateral movement including fluid operated elements adapted to engage said drawbar.

6. In a tractor, a drawbar having relative longitudinal movement with respect to said tractor, means for mounting said drawbar for free lateral swinging movement in one longitudinally displaced position thereof, and means adapted to engage the side edges of said drawbar intermediate the ends thereof in another longitudinally displaced position thereof to maintain said drawbar in a fixed position.

7. In a tractor, a drawbar having relative longitudinal movement with respect to said tractor, means for mounting said drawbar for free lateral swinging movement in one longitudinally displaced position thereof, means adapted to engage the sides of said drawbar in another longitudinally displaced position thereof to maintain said drawbar in a fixed position, and means yieldably resisting movement of said drawbar from either of said longitudinally displaced positions to the other.

8. In a tractor, a drawbar having relative longitudinal movement with respect to said tractor, means for mounting said drawbar for free lateral swinging movement in one longitudinally displaced position thereof, means adapted to engage the sides of said drawbar in another longitudinally displaced position thereof to maintain said drawbar in a fixed position, and means yieldably resisting movement of said drawbar from either of said longitudinally displaced positions to the other, said movement resisting means providing the pivot point for said drawbar.

9. In a tractor, a drawbar having relative longitudinal movement with respect to said tractor, means for mounting said drawbar for free lateral swinging movement in one longitudinally displaced position thereof, means adapted to engage the sides of said drawbar in another longitudinally displaced position thereof to maintain said drawbar in a fixed position, and means yieldably resisting movement of said drawbar from either of said longitudinally displaced positions to the other, said movement resisting means transmitting the draft forces from said tractor to said drawbar.

10. In a tractor, drawbar means including an oscillatable member adapted for connection to a drawn vehicle, a member pivotally connected to said oscillatable member, mounting means for said member restricting said member to limited endwise movement, and means conditioned by endwise movement of said member for preventing oscillation of said oscillatable member.

11. In a tractor, drawbar means including an oscillatable member adapted for connection to a drawn vehicle, a member pivotally connected to said oscillatable member, mounting means for said member restricting said member to limited endwise movement, and means conditioned by endwise movement of said member for preventing oscillation of said oscillatable member, said mounting means including means yieldably resisting endwise movement of said members.

12. In a tractor, drawbar means including an oscillatable member adapted for connection to a drawn vehicle, fluid pressure means including a cylinder and a piston connected to said member.

fluid pressure means intermediate the ends of said member including auxiliary cylinders, and auxiliary pistons movable to contact said member, and conduit means connecting said first cylinder to said auxiliary cylinder whereby movement of said first piston controls movement of said auxiliary pistons to prevent oscillation of said member.

13. In a draft vehicle, a drawbar on said vehicle and adapted to be connected to another vehicle, means mounting said drawbar for swinging movement under tension forces and for preventing destructive impacts when the forces on said drawbar change from tension to compression, and means for holding said drawbar against said swinging movement, said holding means and said drawbar being mounted for relative movement with respect to each other.

14. In a draft vehicle, a drawbar adapted at one end for connection to a drawn vehicle, means mounting said drawbar for swinging movement under forces placing tension thereon including a pivotal connection at the other end of said drawbar, and means for preventing such movement under forces placing compression on said drawbar, including means engageable with said drawbar intermediate the ends thereof for holding said drawbar always in the same central fixed position irrespective of the swung position of said drawbar when under tension forces.

15. In a tractor, a drawbar, mounting means therefor providing a swinging position for said drawbar, and a fixed position therefor, and fluid operated means yieldably resisting movement of said drawbar from either of said positions to the other.

16. In a tractor, a drawbar, means for mounting said drawbar for swinging movement, normally inactive means for preventing swinging movement of said drawbar, said movement preventing means and said drawbar being mounted for relative movement, and means controllable by an operator for effecting said relative movement.

17. In a draft vehicle, a frame, a drawbar, means mounting said drawbar on said frame for pivotal and longitudinal movement, said drawbar having free pivotal movement in a longitudinally displaced position thereof when under tension forces, opposite members movably mounted on said frame, and actuating connections between said members and said drawbar; the longitudinal movement of said drawbar which occurs when the forces thereon change from tension to compression, serving, through said connections, to move said members into engagement with said drawbar to prevent pivotal movement thereof.

18. In a tractor, a frame, a drawbar, means mounting said drawbar for swinging and endwise movement on said frame, and opposite members movably mounted on said frame, said members being movable to engage said drawbar to prevent swinging movement thereof in response to endwise movement of said drawbar under loads placing compression on said drawbar.

19. In a draft vehicle, a frame, a drawbar, means mounting said drawbar on said frame for swinging and longitudinal movement, opposed outwardly diverging cam means on said frame, and means on said drawbar intermediate the ends thereof engageable with said cam means in a longitudinally displaced position of said drawbar to prevent said swinging movement.

20. In a draft vehicle, a frame, a drawbar, means mounting said drawbar on said frame for swinging and longitudinal movement, opposed outwardly diverging cam means on said frame, means on said drawbar engageable with said cam means in a longitudinally displaced position of said drawbar to prevent said swinging movement, and shock-absorbing means for said longitudinal movement.

21. In a tractor, a drawbar, mounting means for said drawbar providing swinging movement thereof, and means mounted on said tractor for translational movement with respect to said tractor and with respect to said drawbar and selectively operable by the operator of said tractor indepedent of driving movement of said tractor for effecting said translational movement and preventing said swinging movement of said drawbar.

OSCAR L. STARR.